United States Patent [19]
Herman, Jr.

[11] 3,757,846
[45] Sept. 11, 1973

[54] METHOD AND APPARATUS FOR EFFECTING ELECTROMAGNETIC DISPLACEMENT OF FLUIDS

[76] Inventor: Harry H. Herman, Jr., 4201 Cathedral Ave., N.W., Washington, D.C. 20016

[22] Filed: Apr. 12, 1971

[21] Appl. No.: 133,102

Related U.S. Application Data

[60] Continuation-in-part of Ser. No. 710,108, March 4, 1968, which is a division of Ser. No. 776,885, Nov. 28, 1958.

[52] U.S. Cl.................. 164/51, 310/11, 310/251
[51] Int. Cl................................................. B22d 27/02
[58] Field of Search.................. 164/49, 114, 51, 164/251; 310/10, 11

[56] References Cited
UNITED STATES PATENTS

| | | | |
|---|---|---|---|
| 3,010,153 | 11/1961 | Bittner | 164/114 X |
| 3,206,768 | 9/1965 | Preston | 3/1 |
| 3,263,283 | 8/1966 | Allard | 164/49 |
| 3,527,220 | 9/1970 | Summers | 128/260 |

FOREIGN PATENTS OR APPLICATIONS

307,225   10/1917   Germany .............................. 310/11

*Primary Examiner*—D. X. Sliney
*Attorney*—Robert E. Isner, Peter J. Franco and Spencer T. Smith

[57] ABSTRACT

This invention related to effecting the movement of liquids by electromagnetic means. Liquids, as used herein, should be understood to include fluids, generally such as gases, vapors, and plasma. By the proper adjustments of temperature and pressure, materials may be handled as liquids, vapors, or plasma. Fluidized solids are also contemplated within the scope of the term liquid, as are magnetic fluids.

8 Claims, 17 Drawing Figures

PATENTED SEP 11 1973 3,757,846

METHOD AND APPARATUS FOR EFFECTING ELECTROMAGNETIC DISPLACEMENT OF FLUIDS

This invention is a continuation in part of my application Ser. No. 710,108 filed Mar. 4, 1968 which is in turn a division of my application Ser. No. 776,885 filed Nov. 28, 1958.

The invention broadly comprises methods and apparatus for imparting movement to liquid by electromagnetic force and more specifically comprises imparting movement to an electrically-conductive fluid or fluid containing electrically-conductive material in an electromagnetic field, the electromagnetic force being used as a motive force to move the liquid confined in a container in a field of the electromagnetic force. In one of its simplest forms the invention can be said to comprise supporting a body of liquid in a container which is in an electromagnetic field and causing the movement of the liquid by applying an electromagnetic force to the body of the liquid. By varying the shape of the container and by controlling the electromagnetic force, the various objects and advantages of this invention can be achieved.

For a more complete description of the invention reference is made to the drawings, wherein.

Figure 4:
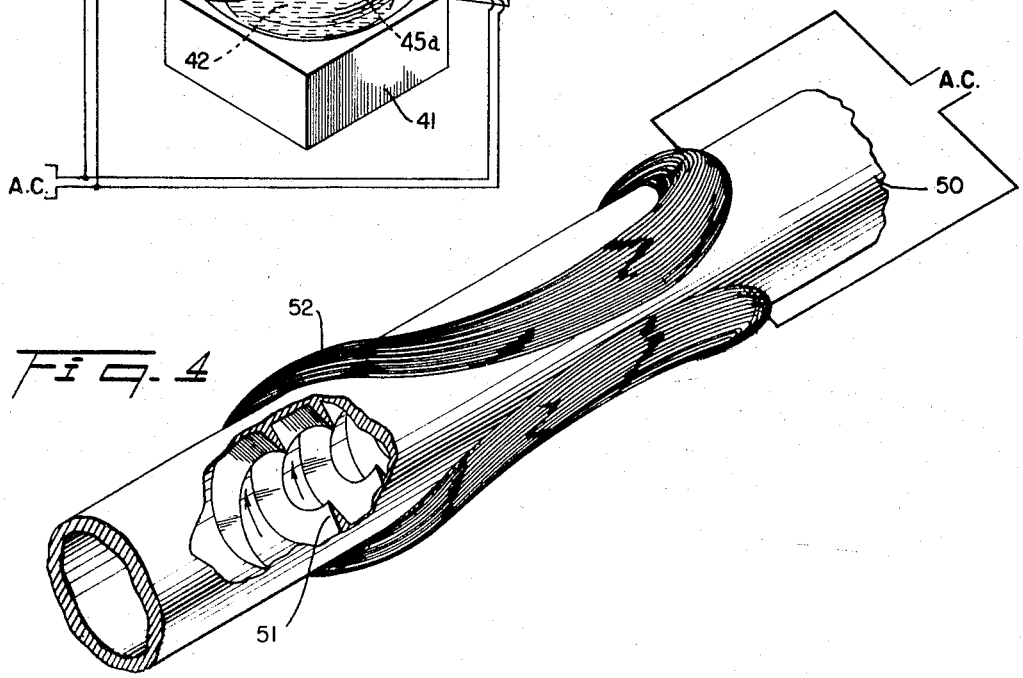
FIG. 4 is a schematic perspective view of a still further form of apparatus embodying the invention wherein the liquid is contained in a cylindrical pipe which is provided with an internal helix and movement is induced in the liquid by induction coils, on the outer surface of the pipe, to induce a rotating magnetic field.
Figure 9:
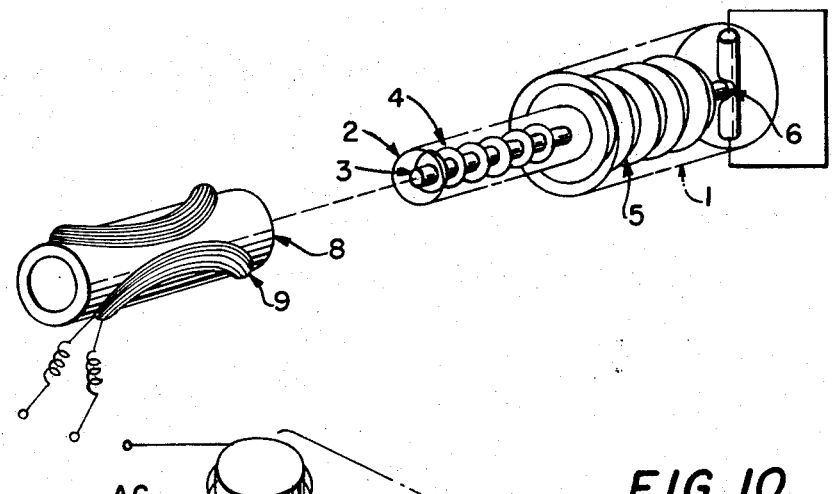

FIG. 9 schematically illustrates an apparatus of the general type shown in FIG. 4 arranged as an electromagnetic servo valve in which the cylindrical pipe with the internal helix is used to force a conducting liquid into a pressure bellows which in term actuates another element such as a valve part, a switch or transducers.

Figure 10:
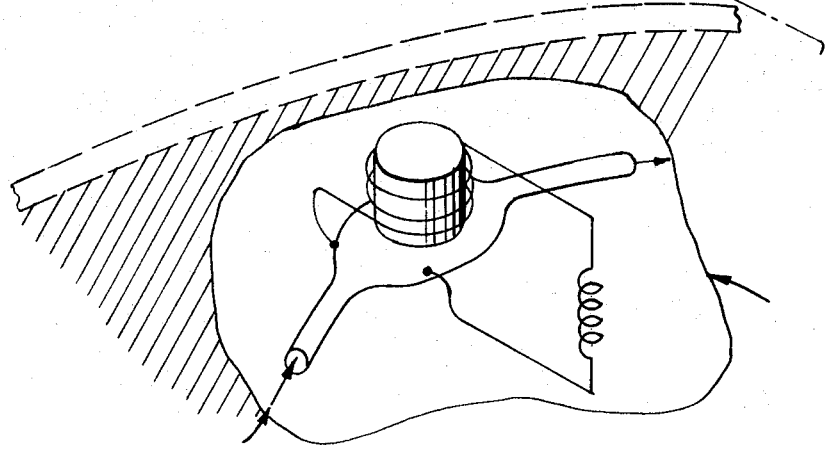

FIG. 10 is a schematic illustration of another embodiment of the invention in which an electromagnetic pump is located within a cavity in a human body and which uses a Lorentz force for achieving the motion of electrically-conductive body fluids.

Figures 6, 6A, 7, 8:
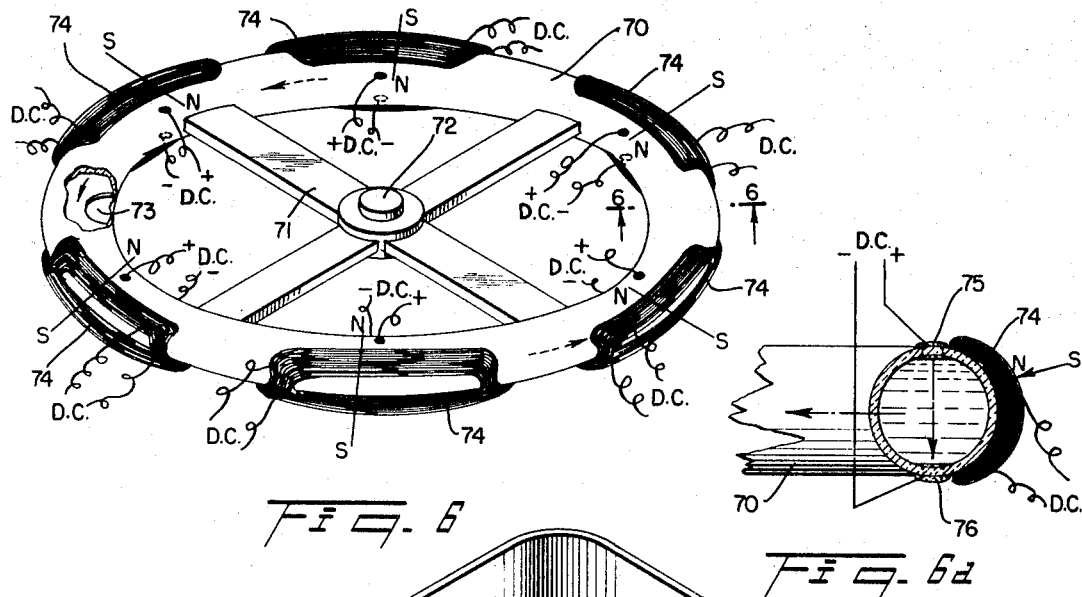
FIG. 6 is a schematic perspective view of another form of apparatus embodying the invention in which liquid is confined in a toroid and a rotational motion is imparted to the liquid by imposing upon the liquid an unidirectional electromagnetic force.
FIG. 6a is a cross-sectional view of the apparatus of FIG. 6 taken along the lines 6—6 to show interior detail.
FIG. 7 is a still further form of apparatus embodying the invention wherein the liquid is contained in a toroid and is subjected to two types of magnetic forces, one of the unidirectional type illustrated in FIG. 6 and 6a and the other the rotating induced magnetic force illustrated in FIG. 2, the two types of forces being combined to rotate the liquid.
FIG. 8 is a further embodiment of the invention wherein are combined both the unidirectional and the rotating induced magnetic forces to raise liquid in a container.
Figure 11:
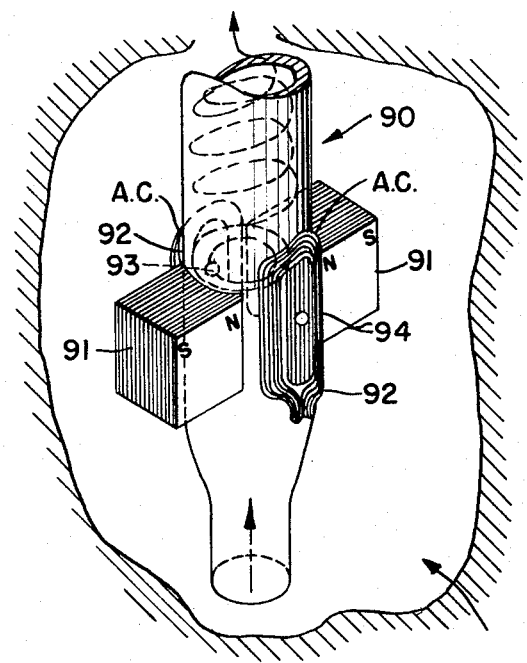

FIG. 11 is an illustration of an application of the apparatus of FIG. 8 for causing circulation of a specific body fluid through compound motion, or agitation and pumping, or selective use of either.

Figure 1:
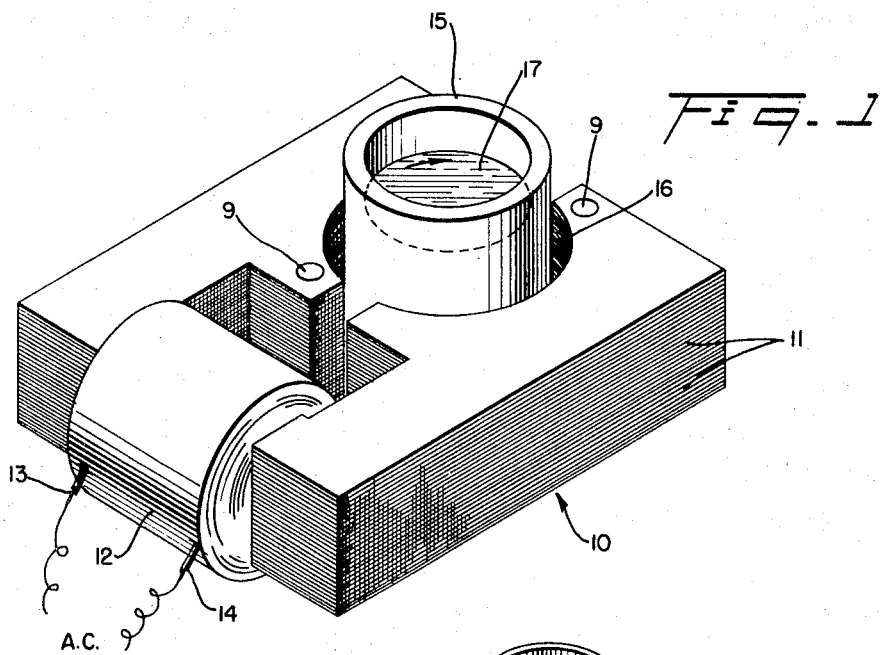
FIG. 1 is a schematic perspective view illustrating a simple form of apparatus embodying the invention wherein the liquid is contained in a cylindrical container and the electromagnetic force is applied by an electromagnetic induction stator adapted to induce a rotating magnetic field.
Figure 12:
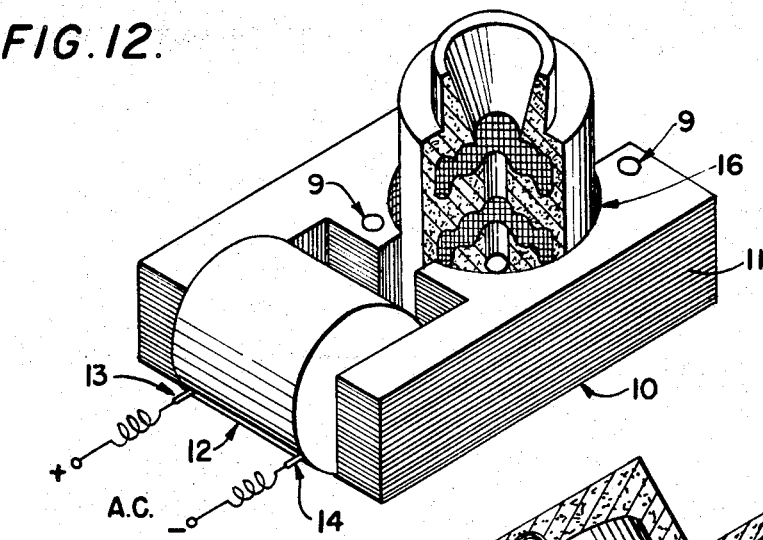

FIG. 12 illustrates a simple form of apparatus of the type shown in FIG. 1 as adapted to the making of centrifugal castings.

Figure 13:
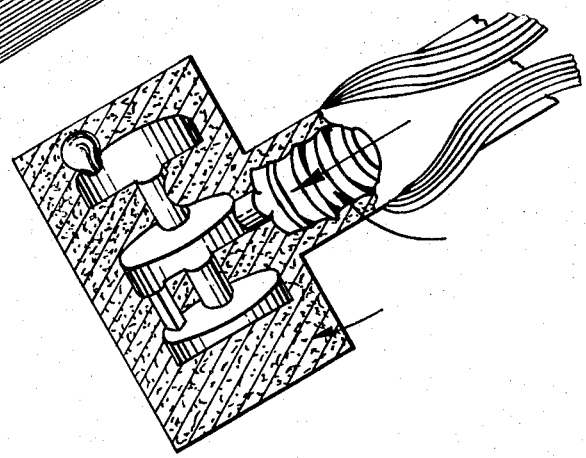

FIG. 13 illustrates the embodiment of FIG. 4 in which the pumped fluid is used to achieve a die casting; this schematically shows a section of the device of FIG. 4 depicting the molten metal being forced into a typical die-casting mold.

Figure 14:
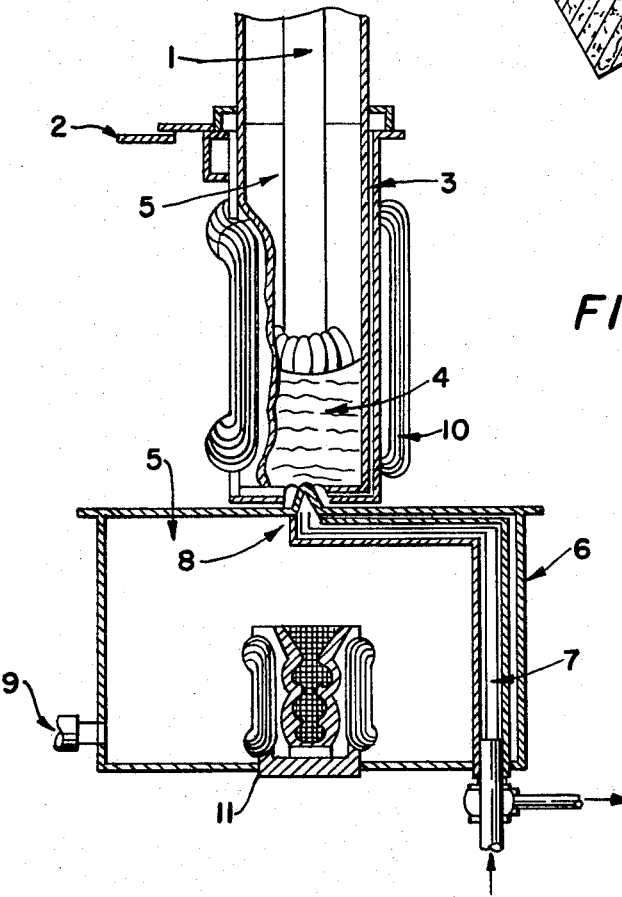

FIG. 14 shows an improved consumable-electrode arc melting furnace which is equpped with coils for causing electromagnetic agitation of the molten metal, as well as coils for enabling the production of centrifugal castings.

Figure 15:
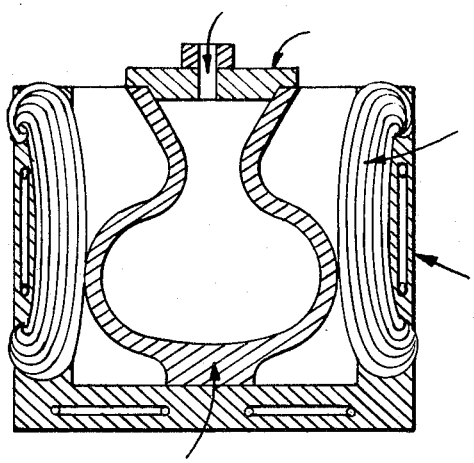

FIG. 15 depicts a further form of this invention wherein a combination of electromagnetic heating, as well as centrifugal force are applied to the melt. This can also be applied to die-casting. It enables control of temperature combined with electromagnetic casting.

Figure 16:
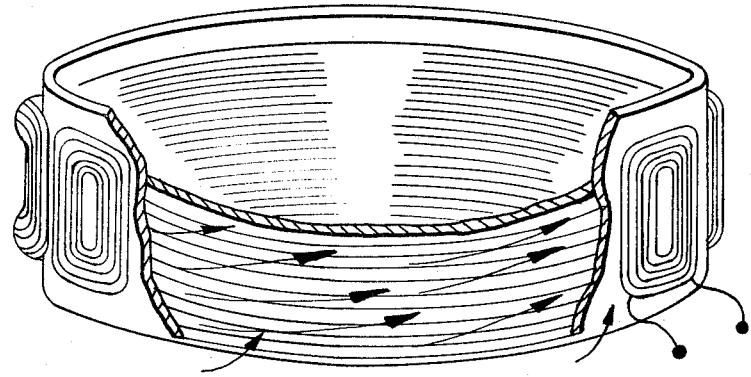

FIG. 16 illustrates a further form of this device which, by rotating a liquid metal, enables the casting upon its surface of a less dense material of negative parabolic mandril or form, as well as other shapes.

FIG. 1 illustrates a means for inducing a rotating electromagnetic field which means is designated 10. This may be in the form of a stator similar to that used for an induction motor and may be made up of laminated metal plates 11 and have a suitable coil or winding 12 having lines 13 and 14 for connection to suitable A.C. voltage source. Shaded poles, such as brass bars 9 positioned in drill holes in the laminated plates 11, are provided to create unbalance to produce a rotating magnetic force field. A container 15 may be disposed in the opening 16, defined by the stator 10, so that it is in the field of rotating magnetic force.

A liquid 17 to be rotated may be confined in the container or poured therein after the container has been positioned in the opening 16.

The invention is not limited to the movement of a metal such as mercury, which is liquid at normal temperatures and pressures, but may also be used with other metals in a molten vapor or gaseous state. The invention may also be used with non-metallic liquids which are electrically conductive. The container should usually be of suitable non-conductible material but satisfactory results may be obtained by the use of containers of conductive material if the container is electrically insulated from the coils or plates of the magnetic force inducing device by an air gap or other non-conductive shield.

It has been found that the liquid should be electrically-conductive in order to be satisfactorily rotated in the container; however, in the case of liquids which are not electrically-conductive, a readily separable electrically-conductive liquid can be combined with the liquid to be rotated so that rotation may be achieved of the non-conductive liquid. Certain alkali metals have been found favorable for this purpose. Another means of having a non-conductive liquid is to disperse electrically conductive solid particles through the non-conductive liquid. Such particles will be caused to move and cause the non-conductive liquid to move with them.

Although any ionized gas, plasma, or other electrically-conductive fluid can be moved by electromagnetic means, the following are mentioned because of their ease of use: Mercury, sodium, and potassium, and NA K-77, which is a eutactic alloy containing 77.2 percent K by weight. It is a silvery metal similar to mercury but with a lower density. It melts at 9.95°F and boils at atmospheric pressure at 1400°F. Another liquid can be a mixture of 56% potassium and 44% sodium, this has the lowest electrical resistance of all the NA K mixtures (41.6 micro ohms per centimeter at 100°F).

Upon application of alternating current of the coil 12, the conductive liquid or the non-conductive liquid which has been combined with conductive liquid or conductive solids at first develops small eddies at various parts of its body and slowly the entire body of the liquid starts rotating about the axis of the container. If a physical axis is aplaced in the container or if the container has a physical axis located therein, it has been found that the liquid will begin to rotate more rapidly. However, a central axis is not necessary for achieving rotation. The speed of rotation appears to be a function of the frequency and the induced voltage.

The free electrons in the conducting field tend to move in a direction of the applied rotating magnetic fluid or Lorentz force. These electrons will impart energy to the fluid at collision which occurs at the end of its mean free path. Regardless of what the electron collides with, it will impart a resultant velocity during its collision. These free electrons in motion will therefore collide with particles (any number of specific types) imparting energy to them, and causing motion. These same electrons will create ions during some of their collisions with atoms and will cause both positive and negative ions. The negative ions will move in the direction of the electrons and aid in imparting motion to the fluid. The positive ions will try to move in a direction opposite to that of the electrons and negative ions, and will tend to decrease the velocity of the fluid. Since the number of electrons and negative ions will greatly outnumber the positive ions, the fluid will be caused to move in the direction of the electrons and negative ions.

A specific application of the apparatus of FIG. 1 can be for stirring or the agitation of liquids in sealed containers, such as various fluid mixtures must be agitated or mixed prior to sale or use. The extent of the stirring or agitation which can be induced in a liquid will be appreciated from the fact that a body of mercury liquid weighing 15 pounds was placed in a container within a rotating magnetic field using 2,000 watts of electricity. The mercury was thereby rotated at a sufficient speed to cause a large vortex in the center of the container and the mercury rose up the sides of the container. The frequency of the apparatus was 60 cycles per second. It has been determined that if the frequency or voltage is increased, the speed of rotation will be increased.

In the handling of liquids which are extremely corrosive or are at greatly elevated temperatures or liquids which are radioactive in nature, the problem of transferring the liquids from one container to another and of agitating liquids has been a difficult problem. In order to move such liquids from one container to another, pumping means and valve means have been necessary. Each of such means have required moving parts in contact with the corrosive, extremely hot or otherwise destructive liquids, and great difficultires have been experienced. Also where it has been necessary to agitate or stir the liquids, difficulty has been encountered in effecting such agitation and stirring because of the corrosive and other destructive effects of such liquids on any agitators fixed in the vessels containing the liquid or introduced into the liquid for the purpose of such agitation.

Furthermore, in the treatment of other liquids which must be treated under pressure or for other reasons must be sealed from the atmosphere because of the nature of the treatment or of the liquid to prevent contamination of the liquid or contamination of the atmosphere, the handling of such liquids in sealed containers and the treatment thereof has been greatly complicated by the necessity of actuating the liquid in the sealed containers.

Frequently where liquids of a dangerous or corrosive nature require treatment by agitation, it has not been possible or practical to permit movement of the container, thereby effecting a degree of agitation of the contained liquid.

It is an object of this invention to provide a means of moving or otherwise agitating liquids in containers without movement of the containers or without contact with the liquids whereby liquids of destructive and corrosive qualities may be safely handled.

It is an object of this invention to provide a means of effectively rotating a body of liquid for gyro applications wherein the liquid freely rotates unfettered by mechanical rotational.

In the field of gyroscopes and devices which make use of the gyroscopic principle, difficulty has been encountered in freeing the gyro rotor from the mechanical limitations attendant upon rotating a member by mechanical means and allowing it to continue its rotation in the same horizon.

A still further object of the invention is to provide means whereby liquids may be handled by controlling their movement from outside of the container and directing their movement by the shape of the container, as well as the direction of the applied magnetic force.

Figure 2:
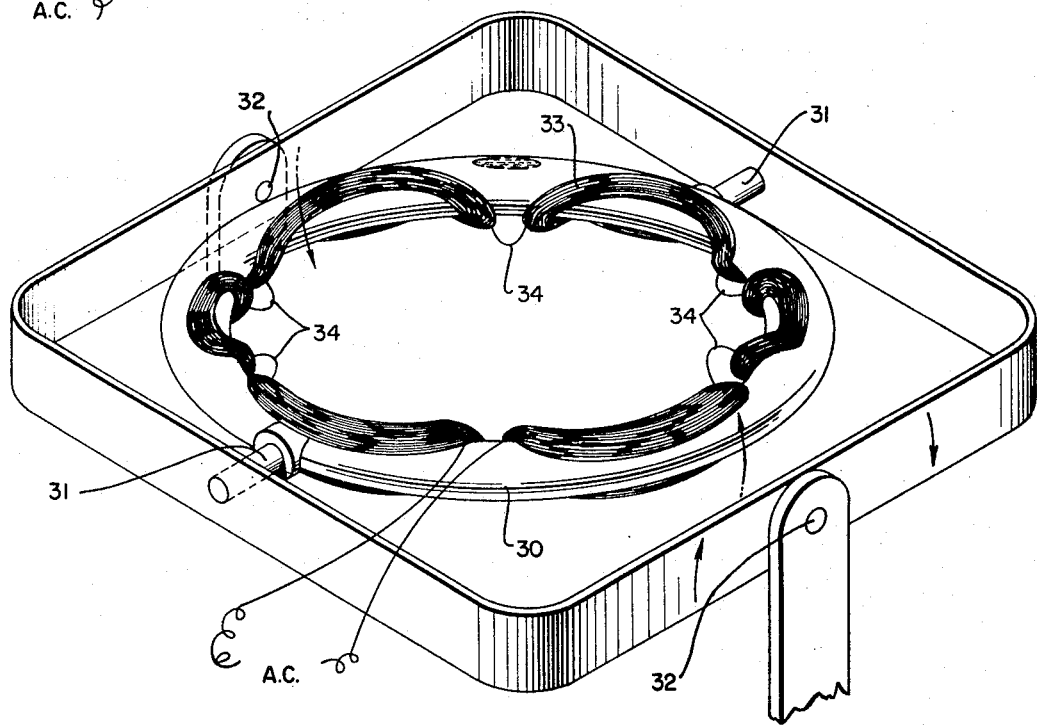
FIG. 2 is a schematic perspective view of another form of apparatus embodying the invention in which a toroid containing liquid is mounted in gimbals, so that the liquid contained in the toroid may be used as a rotor, the rotational motion being imparted to the liquid by induction coils creating a rotating magnetic field.
Figure 3:
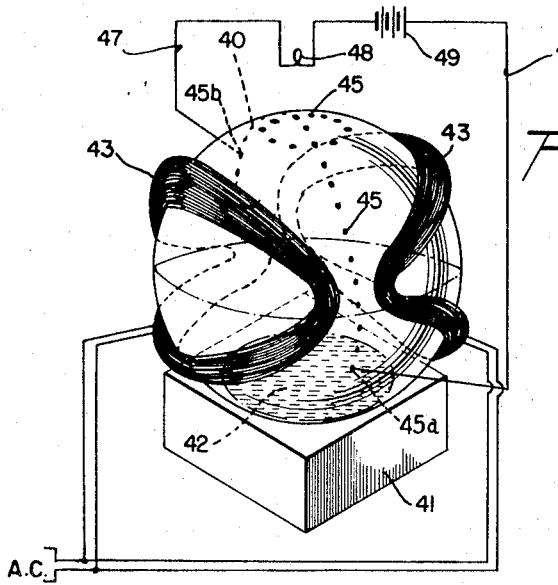
FIG. 3 is a schematic perspective view of another form of apparatus embodying the invention wherein the container for the liquid is a sphere which may also be adapted for use as a gyro-scope, rotational motion being induced in the liquid contained in the sphere by induction coils on the outer surface.

FIGS. 2 and 3 illustrate two forms or embodiments of the invention as gyroscopes, wherein the liquid is held in containers having circular paths for guiding the liquid. In FIG. 2, the container is a toroid or annulus 30 which is mounted in universal gimbals 31 and 32 to permit the toroid to be positioned in any horizon which it seeks to maintain. Induction coils 33 for inducing a rotating magnetic field in the toroid 30 are positioned on the exterior of the toroid and, as shown, are actually laid directly on the surface of the toroid. The coils 33 may be arranged in multiple poles which may be connected together by lines 34. As previously noted, the rotational speed is a function of the voltage and current. The rotational speed may also be varied by the number of poles or pairs of coils provided. FIG. 2 illustrates a six-pole arrangement. Alternating current voltage applied to the coils produces a rotating magnetic field whereby liquids in the toroid is caused to rotate at a speed determined by the input and the number of poles. For purposes of using the apparatus of FIG. 2 for a gyroscope, it has been found effective to use mercury in the toroid because of its mass and favorable electrical qualities. The toroid, itself, may be made of glass, ceramic, or other suitable non-conducting material. The mercury or other fluid may substantially fill the toroid with only sufficient space left to allow for expansion of the fluid.

FIG. 3 shows another form of gyroscope which embodies the invention. In this form, a sphere 40 may be supported on any suitable base 41. A small body of mercury or other suitable electrically-conductive liquid is sealed in the sphere and induction coils 43 are laid upon the exterior surface of the sphere in a broad band in the area in which the liquid will rotate. The coils are attached to a suitable source of A.C. voltage and the liquid is caused to rotate. Upon rotation, the liquid tends to form a narrow path about the equator of the sphere in the plane in which it is first induced to rotate. If the base of the sphere moves into a new plane, the path of rotating liquid in the sphere will tend to continue to rotate in its original plane of rotation and thereby may be used for the purpose of a gyroscope. By providing coils 42 in a broad area of the sphere, this spherical type of gyroscope may be used in gyroscopic applications wherein the movement from the original horizon lies within the rotating magnetic field set up by the coils. The angles of operation of the spherical gyro may be increased by providing additional coils on the spherical surface and providing suitable means for creating magnetic fields by said additional coils.

The fluid ring in the spherical gyro is completely free to remain always in its initial rotating plane. The coils are so mounted that the liquid will rotate in the proper direction and speed regardless of the sphere's position. Pairs of electrical contacts 45 are distributed about the interior wall of the sphere and extend through the wall of the sphere to the exterior. They are mounted so as to make electrical contact with the rotating liquid in the sphere. The electrical contacts will indicate the angle to which the sphere has moved with respect to the original plane of rotation when a circuit is completed between two contacts. For example, contacts 45a and 45b are on diametrically opposite sides of the sphere, are connected to a suitable sensing mechanism when the conducting fluid which is rotating within the sphere makes contact by rotating in an equator which passes into contact with both contact points 45a and 45b. The sensing circuit is completed by the conductive liquid. For purposes of illustration, lines 46 and 47 lead to the sensing mechanism which may be a simple light, relay or directional indicator which is illustrated merely as a coil 48 in the diagram shown in FIG. 3. In line 46 a source of power such as battery 49 is provided.

These same electrical contacts can be used to activate different sets of coils 42 which are mounted on the surface of the sphere to keep the electromagnetic force bound within the initial plane of rotation.

It will be noted that by the use of a liquid such as mercury within the toroid type of gyro shown in FIG. 2 or the spherical type shown in FIG. 3, that the usual difficult problem of obtaining a dynamic balance is eliminated because the liquid is by its nature self-distributing and self-balancing.

It will also be understood that there are no bearings required to support the rotor. The liquid is supported in the container and another fluid, if desirable, can be used as a lubricant between the rotating fluid and the inner surface of the container to decrease any frictional losses.

By virtue of these designs, FIGS. 2 and 3, all of the motion is contained within a sealed element which will eliminate many environmental problems encountered in the use of gyroscope apparatus in missiles, aircraft, and nautical applications.

The embodiment shown in FIG. 3 illustrates particularly the usefulness of the invention for a gyroscope in that all bearings needed for the usual gimbals shown in FIG. 2 have been eliminated.

It will also be appreciated that a gyro made in the form shown in FIG. 3, which may be completely sealed and in which all exterior moving parts have been eliminated, can be readily miniaturized for missile applications and for other uses in guidance systems where it is particularly desired to reduce space and weight requirements.

The apparatus of FIG. 4 forms essentially a pump. It has the advantage of being usable in either direction by reversing the rotating magnetic field. The liquid may be caused to rotate in the reverse direction and the liquid will be therefore caused to spiral and move in the opposite direction to the arrow shown in FIG. 4. Furthermore, there are no moving parts required for such a pump.

In FIG. 4 a further embodiment of the invention is illustrated wherein a cylindrical conduit 50 of non-conducting material adapted to contain an electrically-conductive liquid which is to be moved there through is provided with an interior screw thread or spiral 51. On the exterior of the cylindrical conduit 50 coil means 52 are positioned to induce a rotating magnetic field within the conduit 50. Upon applying an alternating current to the coils 52 liquid is made to rotate in the conduit 51 and the screw thread on the interior of the conduit 50 causes the liquid which is contained in the conduit to advance in the direction of the arrows indicated in FIG. 4. The lead or pitch of the threads of screw may be changed to change the speed at which the liquid will be moved axially in the conduit. The mechanical advantage increases with a decrease in the pitch or lead. The rotational speed of the liquid is also a factor in determining the speed of axial movement of the fluid through the conduit.

A liquid metal servo valve or servo motor can be readily accomplished using either the rotating magnetic field, or the Lorentz force, or both of them in combination. Referring to FIG. 4, the conducting fluid is forced along the interior of the tube. This case illustrates the gain in mechanical advantage by using the rotating magnetic field. By placing a simple diaphragm or switch at the end of this tube, a servo valve is achieved, therefore, the liquid under force (in either direction) can operate the valve or switch arrangement.

By use of electrical switches instead of valves, a type of liquid activated solenoid switch is achieved. Theoretical calculations and tests have shown that considerable pressures are obtainable with this technique, and are more than sufficient to accomplish this task.

In the field of servo valves and control mechanisms, considerable difficulty is encountered in using conventional fluids for controls in high-temperature applications such as high-performance aircraft, missiles, space vehicles, and nuclear reactor controls, etc. This is especially true for temperatures in excess of 1,000°F. The use of molten metals, and even ionized gases, is one method of solving this problem.

Further, in the control of reactions and in handling of material the use of electromagnetic forces has great merit. For the containment of material in a zero "G" environment (space), both the containing and the handling can be readily accomplished by the techniques discussed in this patent.

It should also be recognized that this invention broadly encompasses the use of a magnetic bottle generated by the Lorentz force, which further acted upon by the moving magnetic field. Such enables the movement of the magnetic bottle, as well as a method of achieving greater control. This can be especially useful in controlled fusion reaction techniques.

It must further be appreciated that the use of the Lorentz force in combination with a moving magnetic field is a reversible process. A further embodiment of this invention is the generation of magnetic fields. Referring to FIG. 7, if the D.C. current is applied to terminals 86 and 87, and the fluid contained in 80 is moving by use of the moving magnetic field (coils 81) a strong fixed-polarity magnetic field will be generated. Depending upon the speed of fluid rotation, this field can become an instantaneous, very high, Gauss field in the direction of coils 85. Other configurations can focus or direct this magnetic field as necessary.

FIG. 9 illustrates one example of a liquid metal servo valve. This (1) in the referenced figure; (2) is the pump container similar to FIG. 3 previously discussed; (3) is a center insulator; (4) is the helix filled with a conductive fluid; (5) is a pressure expansion bellows; (6) is a plunger, (7) is a valve; (8) an insulator sleeve; and (9) is an AC pump field. This can be any or a combination of fields to match the specific applications.

The fluid is forced up against the bellows (5) causing the plunger (6) to activate the valve (7). This could also be a switch or a transducer.

This type of liquid metal servo valve is of marked utility in control mechanisms where operation at high temperature is required, such as supersonic aircraft or in nuclear reactor control where normal hydraulic fluids would not survive the high temperature or the environment. This can, of course, be used for controlling the flow of molten metal in the casting processes described in the disclosure.

Figure 5:
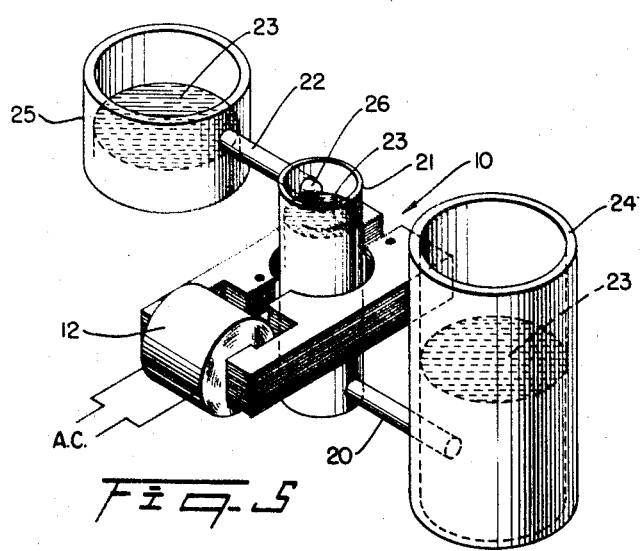
FIG. 5 shows a device similar to the form of invention shown in FIG. 1 with a cylindrical container having inlet and outlet pipes as indicated.

The apparatus illustrated in FIG. 5 shows that an effective pump and valve means can be obtained from use of the apparatus and that no moving parts are required to pump, i.e., raise the liquid, from the level 23 in the lifting chamber 21 out through the outlet line 22 and that as a pump and valve arrangement, which effectively prevents flow when the magnetic force ceases, would be of utility in the handling of corrosive or otherwise dangerous and destructive liquids. For the purpose of illustration, the upper end of the container 21 has been left open. However, in an actual application such opening much well be closed if the liquid was corrosive or otherwise noxious or if the liquid was being treated under other than atmospheric conditions.

The apparatus schematically shown in FIG. 5 illustrates the use of the invention as a simple form of combined valve and pump wherein there is an intake line 20 to a cylindrical lifting chamber 21 and an outlet line 22 spaced vertically above the inlet line 20. The same type of electromagnetically inducing means may be used, as shown in FIG. 1, that is, an induction coil 12 with laminated plates 11 defining the stator 10 to induce a rotating magnetic force to rotate the liquid in the container when alternating current is applied to the coil 12. To use the apparatus shown in FIG. 5 as a pump and valve, the inlet pipe 20 may be connected to a vessel 24 so that liquid in such position flows through the line 20 to a level 23 in the cylindrical lifting chamber 21. The liquid in the lifting chamber 21, when subjected to a rotating magnetic force, is caused to rotate and form a vortex. The liquid adjacent the inside walls of the chamber 21 rises up the walls and flows out through the outlet pipe 22 into another container 25 or to some other discharge point.

It will be understood that such design features, as providing a tangential scoop 26, may be provided to improve delivery through outlet opening 22. Also, the walls of the lifting chamber 21 may be suitably shaped to aid in raising the liquid, e.g., a helix may be formed on the walls for guiding the liquid upward.

By referring to FIG. 8 and its explanation, it can be appreciated that the container 90 can be used as the container 21 in FIG. 5. By using the combined moving magnetic field and the Lorentz force, the liquid in rotation will be scooped into vain 26, the liquid can also be forced axially up the container into another system, to operate a switch or valve arrangement as previously discussed, etc.

It must be appreciated that a high speed of rotation can be given to fluid 23 in FIG. 5 causing the effect of a centrifuge. This technique can be used for operation of gases and vapors. The heavier and more dense being forced to the outside and into the other container. Speed of rotation can easily be achieved, and if necessary, flow rate can be accomplished by a Lorentz force as illustrated in FIG. 8. Pulsing action can also be accomplished by having the moving magnetic field cause the centrifugal action, and the Lorentz force the pulsing either in the direction of the centrifugal force, opposite, or axially, as is needed, in fact all can be accomplished and charged by simple switching action.

Referring to FIG. 6 the apparatus shown in a toroid 70 or other convenient suitable container which, for purposes of illustration, may be used as rotor having suitable supporting spokes or other supporting means 71 to support the rotor on its axis 72. The toroid 70 is filled with suitable electrically-conducting material. In the cut-away portion of FIG. 6 it will be noted that on the interior wall of the toroid is provided fins or blades 73 which may be fixed to the walls of the toroid either on the larger or smaller diameters depending upon the use to be made of the rotor. In the form shown in FIG. 6 the electromagnetic force imposed on the liquid is that known as the Lorentz force which results in a force to move a conducting fluid in a direction normal respectively to a direct current flow and to an applied magnetic force.

In FIGS. 6 and 6a several coils 74 are fixed to the exterior of the toroid 70. These coils are adapted to carry direct current and for that purpose are connected to suitable D.C. sources. The coils 74 produce a magnetic force of fixed polarity acting upon the fluid in the toroid. These coils may also be replaced by permanent magnets. Associated with each coil 74 are the contact elements 75-76 which extend through the wall of the toroid to make electrical contact with the liquid contained in the toroid. The contacts 75 and 76 are connected to a suitable source of direct current which provides a current flow as indicated by the arrows. As a result of the magnetic force of fixed polarity and the flow of current via the electrically-conducting fluid will be moved in a direction at right angles to the flow of the current between 75 and 76 and at right angle to the polarity of the coils which for the purpose of illustration, is indicated at each coil in the diagram in FIG. 6 as well as in FIG. 6a. Arrows have been placed in FIGS. 6 and 6a to indicate the flow of the liquid in the container 70 which in FIG. 6 is counterclockwise. It will be understood that by placing the liquid in a curved toroidal chamber and that by placing magnetic coils 74 and electrical contacts 75 and 76 at points around the toroid, that the unidirectional movement caused by the Lorentz force induced at each device around the toroid results in a combined movement of liquid which is rotational in nature. To obtain the most desirable results and to achieve what is known as a coupling force, each coil 74 with its related contacts 75 and 76 should be placed in diametrically opposed relationship around the toroid, which, for the purpose of acting as a rotor, should be substantially circular. In this particular application in which the toroid is used as a rotor, it may be accelerated and decelerated by the amount of current imposed through the coils 74 and the current contact points 75 and 76. Electrical connections may be made and maintained through suitable brush contacts to the several coils 74 and contacts 75 and 76.

By controlling the viscosity of the liquid, the speed and mechanical advantage of the system may be controlled. Heat may be one means of changing the viscosity of the fluid during operation of the device.

It will be understood that the Lorentz force can be used in the other types of applications for achieving rotation as in FIGS. 1-4 and also it will be understood that the use of a rotating container as a turbine rotor, as illustrated in FIG. 6, may be rotated by means of the rotating electromagnetic force in connection with the illustration in FIGS. 1 through 4.

FIG. 7 illustrates a toroidal container 80 which is provided with an electrically-conductive fluid and which is adapted to be displaced by the compounded action of a rotating electomagnetic field and Lorentz force.

Coils 81 for inducing a rotating magnetic field in the fluid are linked by lines 32 to form a six pole arrangement similar to that described in FIG. 2. The coils 81 coils induce a rotational motion in the liquid contained in the toroidal element 80 when alternating current is applied through the lines 83 and 84. Also arranged on the exterior of the toroid so as to apply a Lorentz force at various locations around the toroidal container 80 are D.C. coils 85 to produce a fixed polarity magnetic field, and associated contact points 86 and 87 for directing a current through the toroidal container in the same manner as described with regard to the apparatus in FIGS. 6 and 6a. It will be understood that by applying the rotating magnetic force and the unidirectional force at various locations around the toroidal container that the liquid is caused to rotate by both electromagnetic forces.

This is an example in which both of the foregoing electromagnetic forces are utilized to cause rotation of the liquid. This is a method of advantage where great velocities or masses of fluid have to be rotated. For purposes of illustration, FIG. 7 is shown as a gyroscope rotor mounted in gimbals as in FIG. 2. The combined method shown in FIG. 7 for causing rotation is of advantage during the initial starting of the fluid in motion and one of the two methods may be switched off after a fluid has reached its desired velocity. The decreased load at that time may be handled by either of the two methods shown. The provision of the two means to rotate the fluid in the event of breakdown of one of the methods, such as an alternating current failure having stand by direct current batteries which would produce the Lorentz force.

FIG. 8 is a non-conducing pipe element 90 on the surface of which are mounted permanent magnets 91, and coils 92, and containing two contact elements 93 and 94 mounted upon the inner surface of the pipe 90. Upon application of direct current to the contact elements 93 and 94, current will flow from 93 to 94 through the conducting fluid contained within the non-conducting pipe 90. This current flow will cause a Lorentz force resulting in motion in the upward direction, as shown in FIG. 8. If at the same time an alternating current is applied to coils 92 creating a rotating magnetic field in the same manner as described for example in FIG. 1, the induced electromotive force causes the fluid to rotate circularly within the pipe element. The resultant motion of the fluid acted upon by the two forces will be a spiralling upward movement. It will be appreciated that the use of these combined forces may be utilized as a pump or valve or in other applications in which it is necessary or desirable to raise and/or rotate fluids. The shape of the walls of the container may be designed as suggested in FIG. 4, to provide suitable mechanical advantage.

It will be appreciated that the lifting force exerted by the permanent magnet (which may be electromagnet of fixed polarity) may be applied usefully in an apparatus such as the spherical gyro of FIG. 3 to initially lift the liquid into its rotational equatorial path.

It will also be understood that this invention can be employed in certain centrifugal applications because the rotational speeds can be readily controlled and raised and lowered and the direction of rotation can be changed readily. The invention may be applied for the treatment of molten metals as well as other electrically-conductive materials at high temperatures as well as very low temperatures. The application of the invention for the handling of molten metals and for the centrifugal casting of such metals will be well appreciated. It will be understood that by moving liquids axially in containers such as cylinders, it can be made to operate pistons or other physical means disposed in the path of the moving liquid.

Also, if electrical contacts are placed in a container above the liquid level and the liquid is caused to rotate and rise to the contact, a suitable switch means may be had. The foregoing are merely to indicate that various means to which the applicant's invention can be applied. The description has sought to suggest that certain of the applications are to indicate certain presently preferred forms of applying the invention can be carried out by other means and may be used to accomplish the various operations within the scope of this invention.

Another embodiment of this invention is adapted for use in creating and assisting the circulation of body fluids. Body fluids are inherently conducting fluids, and such can be used to move by the electromagnetic means described in this disclosure.

Although only two main illnesses are described here by way of example, it should be understood that application of the principles of this invention for treatment of other conditions requiring circulatory assistance are within its envisioned scope.

In 1895 at the National Science Convention Lubeck, Gartner suggested that hydrocephalus, a disorder of the brain, could be treated by correcting the lateral ventricle of the brain with the lymphatic or venous system of the body. Although many attempts were made to do this, it was not until 1949 that Nulsen and Spitz accomplished this in a 14 month old infant with hydrocephalus by connecting the ventricle with the internal jugular vein using two ball valves with a subcutaneous pump. Spitz, in collaboration with an engineer named Holter refined the system into what is called the Spitz-Holter valve. Other valves such as the McPherson type have also come into use.

One of the major difficulties in the past has been the pumping or circulation of the "Brain Fluid." In 1968, Ratcheson and Ommaya pointed out that creation of a cerebrospinal fluid reservoir connected to the lateral ventricle (of the brain) had considerable merit. Again the pumping remained a problem. In the technique used, a parastalic device was used. Twenty-eight percent of the cases in one series had complications, and within the first 3 months of implantation 24 percent of the reservoirs failed. The chief reason for the failures was the fatigue cracking of the pumping device. One of the applications of this patent is the use of the various embodiments described to enable implantation of a "solid state" pump which utilized the electrical-conductivity of the "brain" or that of some body fluids to enable electromagnetic pumping. Blood is an electrical conductor, and it is a further intention of this invention to both cause blood to circulate, and to assist its circulation either at the heart, or the arteries, or either a specific artery.

The pump having no moving parts has considerable merit for implantation, as there is nothing to wear out. Further, described earlier, since the magnetic field can be applied from outside the container (or body) arterial flow could be selectively assisted by externally applied magnetic fields.

FIG. 10 shows an embodiment of this invention wherein a Lorentz-type pump is located within a body cavity, and it is activated through induced electrical energy from outside the body. It is further understood that any of the pumping or mixing methods disclosed in this invention are applicable. In some cases, both pumping and mixing are required, such as with cerebrospinal fluid (brain fluid), and that can be accomplished by the methods described herein.

Movement of body fluids which are electrically-conductive such as blood, cereborspinal fluid (brain fluid), urine, etc. can be caused by agitating or pumping, or both, with this invention. This would be desirable in the treatment of ailments which are aggravated by lack of movement, such as, but not limited to, antonia of the ureters (urine), glaucoma (aqueous humour), antonia of the biliary system (bilis), antonia of the colon (liquefied stool), etc. Application of the principles of this invention in inducing movement of glandular secretions is being investigated.

With the advent of new technological advances in such fields as high speed aircraft, missiles, and nuclear energy, the need has arisen for use of high temperature metals. These high temperature metals are useful in such things as turbine impellers, wing and missile skins, and as construction materials in all types of high temperature equipment.

In 1953, the U.S. Army asked the Bureau of Mines to conduct research in the casting of titanium metal. Later this (Report of Investigation No. 5,265 by R.A. Beall and others, United States Department of the Interior.) Later this work was extended to include molybdenum and other metals.

The problem of producing a casting of any metal is:
1. heat the metal to a liquid state;
2. transfer the molten metal to a mold; and
3. hold it within the mold while it cools and solidifies.

This is a simple explanation, however, with many problems arising from specific metals, the character and quality of product required. As an example for this report, titanium metal will be used. Information is taken from the previously referenced report. "Titanium becomes molten at 1600°C. At this high temperature it reacts with all common refractories and combines with most metals. At temperatures far below its melting point, titanium is severely attacked by the active atmospheric components. Furthermore, the presence of some contaminants in minute quantities can be detrimental to titanium."

As the report continues, it states that a common feature of most proposed solutions to this problem is the use of vacuum or inert atmosphere as a protection against atmospheric contamination. Many and diverse approaches have been made to the problem of both containing and heating the metal; however, none of them use electromagnetic force to form or cause the forming of the melt, or for valving or pumping of the melt. This discussion will not go into detail concerning the melting processes, except to mention that one satisfactory method utilizes a consumable electrode arc process pointed toward the feasibility of producing castings of these metals. This invention envisions its use with consumable electrode arc furnaces; however, it is not limited to these.

Using these methods, castings have been produced out of titanium and molybdenum. The process combines both a high vacuum (150 microns) and later an inert atmosphere of oxygen and helium. It should also be noted that by using a high vacuum the metal will become molten at a lower temperature. FIG. 14 illustrates the improved consumable electrode arc melting furnace with the electromagnetic pumping, valving, and casting illustrated in this disclosure.

This invention enables centrifugal and die casting to be accomplished utilizing the electromagnetic casting methods described.

Because of the nature of such metals as titanium, and the method developed for casting it and molybdenum, it is extremely difficult to apply normal casting methods to this process. The reasons are many:
1. since the entire process must take place in a reduced and inert atmosphere, it is difficult to facilitate mechanical, hydrolic, or pneumatic methods for die casting;

2. it is equally difficult to cause rotation of the mold (11) in FIG. 14 short of revolving the entire furnace, which might prove quite impractical. FIGS. 12 and 13 show coils similar to FIGS. 1, 4, 5, and they could be combined fields like FIGS. 7 and 8 to move the melt.

It would appear quite desirable to utilize the above methods for casting high temperature metals, since forcing the metal into the mold with a force several times that of gravity would cause the molten metal to more completely fill the mold, and enable the mold to be considerably more complex.

This patent makes use of electromagnetic forces applied directly upon the molten metal to accomplish both (1) and (2.) above.

The standard definition of centrifugal casting is the process of rotating a mold while the metal solidifes, so as to utilize centrifugal force to position the metal in the mold. The metal is forced against the walls of the mold with much greater pressure than that obtained by static pressure in ordinary sand casting. Greater detail on the surface of the casting is obtained, and the dense metal structure has superior physical properties. Castings of symmetrical shape lend themselves particularly to this method, although many other types of castings can be produced. The method set forth herein generally fits into this definition with one very basic difference. The difference is that instead of rotating the die, I rotate the molten metal by use of electromagnetic force. It should further be noted that as well as rotating the liquid (or molten metal) electromagnetically additional force can be placed in specific and various directions on the rotating molten metal to accomplish a number of desire results.

FIG. 12 shows a schematic drawing of the basic (and simplest) method of rotating the metal for centrifugal casting via electromagnetic force. This was generally described previously in this application in conjunction with FIG. 1, and, as mentioned, any of the techniques previously described could be utilized to pump, provide distribution valving, or help to form the metal.

FIG. 12 illustrates the simplest form of centrifugal casting (see also FIG. 1 for details) wherein the molten metal is pumped into the puring port. The electric field is activated and causes the molten metal to rotate in the centrifugal die illustrated. It should be appreciated that this rotating force can be either that illustrated, or a combination of fields as described and illustrated in FIGS. 1 through 9 in this application. As shown in FIG. 9, the combination of forces can either cause a spiraling circular and longitudinal motion, or it can further assist the centrifugal force. It is pointed out that the entire apparatus described in FIG. 12 could be in a vacuum or an inert atmosphere, and the absence of moving parts greatly reduces vacuum and contamination problems and increases reliability of the system.

One of the embodiments of this invention concerns the casting of electrically-conductive fluids for centrifugal casting process; however, wherein the mold remains at rest and electromagnetic forces cause the fluid to revolve within the mold.

This method of centrifugal casting has special importance in the casting of reactive materials which require vacuum or inert or other environmental atmosphere in which to be processed. Thus, electromagnetic means of casting removes the requirement for rotating mechanical equipment within such a special casting vessel.

The application of electric currents and selected phasing of the magnetic fields permit the liquid metal or conductive fluid to be self-revolved about the vertical axis. The superposition of an AC magnetic field on the DC magnetic fields achieves a vibrating liquid and, when this is tuned to the specific resonance requirement of the fluid or liquid metal, it permits its solidification to take place free from the formation of large dendrites. Control of the grain, and even the molecular dipoles is thus possible with electromagnetic casting. Castings made in this manner will exhibit greater homogeneity, and strength in the direction of electromagnetically-induced motion at the time of solidification.

Die Casting is the most widely used of any of the mold processes. Die Casting, as practiced in the United States, refers to the forcing of molten metal into a die or form. The term die used in this process implies a metallic (or formed ceramic) mold which is filled under pressure. Pressures vary according to the kind of metal being cast as well as numerous other factors, ranging from the materials' own weight to 30,000 pounds per square inch.

FIG. 13 illustrates the pump shown in FIG. 4, which is utilized to electromagnetically force the molten metal into the die illustrated. This form of electromagnetic induced die-casting is of utility with exotic materials requiring either a high vacuum or an inert atmosphere. It should also be appreciated that, although FIG. 4 illustrates one pumping technique, any of the others described in this discussion, or combinations, may be used and are envisioned as part of the scope of this invention.

FIG. 8 shows a circular section containing a molten metal (this section might be (7) in FIG. 1). When electromagnetic forces are applied as shown in FIG. 8, they cause a resultant force upon a conducting fluid in the direction of the large arrow. They can be a constantly-applied force, or it can be pulsed to obtain a sudden hammer-like effect. The effect of force created by this method is a direct function of the applied voltage, size and number of coils and electrical conductivity of the fluid.

The typical use of electromagnetic pumping, casting, and valving is illustrated with FIG. 14, which shows an improved consumable-electrode arc melting furnace. This illustration shows coils 10 for causing agitation of the molten metal (melt), and 12 for achieving centrifugal castings.

As shown the cathode power connection (1) and the anodic power connection (2) allow current to flow through the ingot for casting (4). The system is cooled by water (3). A high vacuum or an inert atmosphere is maintained in the areas indicated as (5), via the vacuum or inert atmosphere line (9). The copper plug (8) melts when the melt is liquefied and the molten metal flows into the die 11, This is an illustrative example to show the one application of electromagnetic casting, pumping and valving to systems for melting and casting exotic materials. It will be appreciated that the molten metal (4) could be pumped electromagnetically to the die, and that an electromagnetic valve could be used rather than the copper plug (8).

It is stressed that combinations of centrifugal and die-casting are envisioned in this invention.

Further examples of the combinations of electric fields and the resultant possibilities are the abilities of this new process to cast continuously hollow pipe or tubing. This can be done by the combined forces shown in FIG. 8, as well as by use of the Lorentz force, above, as illustrated in FIGS. 6 and 6a.

Theory indicates that the fluid being rotated need not be magnetic — in fact, it is better if the fluid is not magnetic. The only requirement is that the fluid be an electrically-conductive medium. If, however, the fluid is not conductive enough to be rotated, then as mentioned earlier additives can be added to help increase the conductivity (or ionization). If used, additives will have to be looked at quite carefully to determine the effect of the possible new alloy upon the entire process, and product.

Electromagnetic heating may also be accomplished during the casting process. As the fluid is put into motion via ions and electrons of the material, the particles which osillate back and forth will create heat within the material. Heat can also be applied to the fluid via the magnetic eddies created within the coils of the electromagnets surrounding the molds. This heat can be easily controlled by regulating the inductance of the circuit.

The scope of this invention includes FIG. 15 a device in which fluids, especially rare or exotic metals, such as titanium yttrium, et al., may be brought to a melt within a fixed mold in special atmospheres such as argon, hydrogen, nitrogen, et al., and without need of mechanical rotation of the mold or rotary seals between it and the ultimate housing inclosing the mold, electric and magnetic fields are brought into being that rotate the fluid to such a degree that the material is centrifugally or axially forced into the surrounding confinement of the mold thereafter maintaining this force as the materials' temperature falls until solidification occurs.

It should be understood that this form of electromagnetic heating and cooling process in a centrifugal axial or combination of fields will permit a multi-gravity force during the initial application of the centrifugal force to expunge effectually all air bubbles and cavitations to the interior surface and also provide a finer aligned grain structure to the final casting.

Further examples FIG. 16 of the utility and uniqueness of electromagnetic casting is a device to produce a metallic surface in the form of a change parabola on which to cast a negative parabolic mandral by a centrifugal means whereby a metal such as tin is brought to a molten state and revolved within a container and maintained in this state until a second material of lower density is applied as a thick coating over the metal mold and allowed to solidify. In certain cases, where the negative molded portion is sufficiently uniform, its upper surface is a positive and a near replica of the metal master that it becomes the final copy. Such a copy made of any material and coated with a metal film would produce an inexpensive objective for large light gathering spectrographs in the size range of 10 to 20 feet in diameter.

Causing the motion in molten metals via electomagnetic force requires no moving parts. There are no bearings, or seals needed, no lubrication, and no worry of reaction of the inert atmosphere upon such things as lubricants, etc. Since this process requires no moving parts, it has long life potential and very high reliability. The high vacuum and inert atmosphere are easily maintained, since there are no seals for rotating shafts, etc.

Although not fully understood at this time, centrifugal casting in accord with the principles herein may create a somewhat different grain structure. Tests have shown that the grain structure of metals cast via electromagnetic force appear somewhat different from the structure of the same metal during other casting processes. It is believed that the electromagnetically cast metal may have a finer and more uniform grain structure, since atomic and sub-atomic particles are caused to move in a uniform direction and manner.

Utilizing a rotation magnetic field, one can easily cause the molten metal to rotate. However, if another rotating magnetic field is added either above or below the first one, this second field can be used to cause a higher or lower speed rotation of the fluid within it. What results is a very simple method of causing two different velocities of rotation upon the same fluid within the same mold. These same forces can be applied to cause the melt to be forced into a leg of the portion of the mold to achieve a better casting.

By combining the rotating magnetic fields, rotation in an elliptical path can be effected, and by adding Lorentz forces, non-uniform and multi-directional rotation can also be effected. Lorentz forces can be used to create either pinching effects or expansion forces upon the rotating fluid.

Having thus described my invention, I claim:

1. Apparatus for casting metals comprising
   selectively shaped mold means adapted to receive a charge of electromagnetically displaceable liquid metal having a temperature above its solidification temperature
   means for subjecting the received charge of liquid metal to a selectively directed displacement inducing rotating magnetic field to effect displacement thereof within said mold means,
   means for subjecting the container charge of liquid metal to a selectively directed Lorentz force for supplementing the displacement of the charge within said mold means induced by said rotating magnetic field,
   whereby solidification thereof, while in contact with the contour defining mold surfaces, can be effected.

2. Apparatus as set forth in claim 1 including means for effecting electromagnetically-induced agitation of said charge prior to its introduction into said mold means.

3. Apparatus as set forth in claim 3 including means for effectively electromagnetically-inducing displacement of said charge from a source thereof into said mold means.

4. Apparatus as set forth in claim 1 wherein said means for creating said displacement inducing rotation magnetic field induces heat generation within the displaced charge.

5. Apparatus as set forth in claim 1 wherein said selectively shaped mold means is a moving liquid of greater density than said charge and whose displacement is induced by externally applied electromagnetic forces.

6. A method of casting metals in a selectively shaped mold comprising
   introducing a charge of electromagnetically-displaceable liquid metal at a temperature above its solidification temperature into the mold, displacing the received charge in a selected direction by establishing a rotating magnetic field, and supplementing the displacement of the received charge by generating a selectively directed Lorentz force, whereby the solidification thereof can be effected.

7. The method as set forth in claim 6 including the steps of introducing the charge of castable material into operative engagement with said contour defining mold surface by electromagnetically-induced displacement from a molten supply thereof.

8. An apparatus for displacing electromagnetically displaceable bodily fluids comprising means for subjecting a bodily fluid flowing along a bodily conduit to a selectively oriented rotating electromagnetic field for inducing the displacemt thereof along the conduit, means for conjointly subjecting the bodily fluid to a selectively directed Lorentz force for supplementing the displacement thereof along the bodily conduit, and a source of electrical energy located exteriorly of the body for establishing said electomagnetic field and said Lorentz force.

* * * * *